US012485827B2

(12) United States Patent
Ramakrishnan et al.

(10) Patent No.: US 12,485,827 B2
(45) Date of Patent: Dec. 2, 2025

(54) VEHICLE STORAGE BIN INCLUDING A FLOATING BASE

(71) Applicant: GM Global Technology Operations LLC, Detroit, MI (US)

(72) Inventors: Vijaiya Shankar Ramakrishnan, Tamil Nadu (IN); Muragesh Tubaki, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 376 days.

(21) Appl. No.: 18/304,671

(22) Filed: Apr. 21, 2023

(65) Prior Publication Data

US 2024/0351526 A1 Oct. 24, 2024

(51) Int. Cl.
*B60R 7/04* (2006.01)
*B60N 3/10* (2006.01)

(52) U.S. Cl.
CPC . *B60R 7/04* (2013.01); *B60N 3/10* (2013.01)

(58) Field of Classification Search
CPC .................................... B60R 7/04; B60N 3/10
See application file for complete search history.

(56) References Cited

U.S. PATENT DOCUMENTS

| | | | |
|---|---|---|---|
| 5,524,958 A | 6/1996 | Wieczorek et al. | |
| 7,661,741 B2 * | 2/2010 | Takai | B60R 7/04 296/37.7 |
| 7,708,247 B2 | 5/2010 | Lota | |
| 8,172,294 B1 * | 5/2012 | Hooton | B60R 7/04 220/738 |
| 8,419,101 B2 * | 4/2013 | Stueber | B60N 3/106 296/37.8 |
| 8,910,988 B2 * | 12/2014 | Brinas | B60R 7/04 296/24.34 |
| 8,960,481 B2 * | 2/2015 | Brinas | B60R 7/04 220/531 |
| 8,967,695 B2 * | 3/2015 | Brinas | B60R 7/04 296/37.8 |
| 9,981,611 B2 * | 5/2018 | Shibao | B60R 7/04 |
| 10,524,570 B2 * | 1/2020 | Kiester | A47B 88/90 |
| 11,472,600 B2 * | 10/2022 | Combs | B65D 25/06 |
| 2005/0189776 A1 * | 9/2005 | Sturt | B60N 3/102 296/24.34 |
| 2008/0048466 A1 | 2/2008 | Singh et al. | |
| 2020/0114794 A1 * | 4/2020 | Hoggard | B60N 2/793 |

FOREIGN PATENT DOCUMENTS

FR 2961763 A1 * 12/2011 ............. B60N 2/793

* cited by examiner

*Primary Examiner* — Aaron L Lembo
(74) *Attorney, Agent, or Firm* — CANTOR COLBURN LLP

(57) ABSTRACT

A storage bin for a vehicle includes a bin portion including storage volume defined by a plurality of walls including a base wall, a first side wall, a second side wall, a first end wall, and a second end wall, and a base member arranged in the storage volume. The base member is selectively height adjustable relative to the base wall.

20 Claims, 5 Drawing Sheets

VEHICLE STORAGE BIN INCLUDING A FLOATING BASE

INTRODUCTION

The subject disclosure relates to the art of vehicle storage bins and, more particularly, to a reconfigurable storage bin for a vehicle.

Vehicles include a wide variety of compartments, nooks, holders and the like that are used by drivers and passengers for a variety of purposes. Compartments may be covered, such as glove boxes, change holders, sunglass holders and the like or they may be open such as cup holders. Cup holders may include various gripping structures for holding a standard sized coffee cup. Cup holders are generally sized to accept and retain standard sized beverage containers up to about 20 oz. (600 ml).

Currently, many people have started using new, larger containers that are often times made of metal or other thermal retaining material. The larger containers are typically taller and/or possess a greater diameter that standard 20 oz. (600 ml) beverage containers. Given the difference in dimensions, the larger containers do not typically fit into standard cup holder compartments and/or are not stable when inserted into a standard cup holder compartment. Accordingly, it is desirable to provide a compartment that can accommodate standard beverage containers yet also be reconfigurable to accept and retain larger and/or taller beverage containers.

SUMMARY

A storage bin for a vehicle, in accordance with a non-limiting example, includes a bin portion including storage volume defined by a plurality of walls including a base wall, a first side wall, a second side wall, a first end wall, and a second end wall, and a base member arranged in the storage volume. The base member is selectively height adjustable relative to the base wall.

In addition to one or more of the features described herein a plurality of adjustment mechanisms is operatively connected between the bin portion and the base member.

In addition to one or more of the features described herein a plurality of biasing members is disposed between the base wall and the base member.

In addition to one or more of the features described herein each of the plurality of adjustment mechanisms includes a ratchet assembly that selectively retains the base member in one of a plurality of adjustment positions.

In addition to one or more of the features described herein, the adjustment mechanism includes a gear track arranged on one of the plurality of walls.

In addition to one or more of the features described herein, the ratchet assembly includes an arm operatively to the base member, the arm supporting a ratchet wheel and a pawl.

In addition to one or more of the features described herein, a gear assembly connects the ratchet wheel with the arm, the gear assembly including a gear portion that engages with the gear track.

In addition to one or more of the features described herein, the one of the plurality of walls includes a guide track arranged adjacent the gear track.

In addition to one or more of the features described herein, the guide track is continuous and includes a first section that extends along the gear track, a second section that is parallel to the first section, a third section connecting the first section and the second section at one end, and a fourth section connecting the first section and the second section at an opposing end.

In addition to one or more of the features described herein, the ratchet wheel includes a guide element that extends into and moves about the guide track.

A vehicle, in accordance with a non-limiting example, includes a body defining in part a passenger compartment and a storage bin arranged in the passenger compartment. The storage bin includes a bin portion including storage volume defined by a plurality of walls including a base wall, a first side wall, a second side wall, a first end wall, and a second end wall, and a base member arranged in the storage volume, the base member being selectively height adjustable relative to the base wall.

In addition to one or more of the features described herein a plurality of adjustment mechanisms is operatively connected between the bin portion and the base member.

In addition to one or more of the features described herein a plurality of biasing members is disposed between the base wall and the base member.

In addition to one or more of the features described herein each of the plurality of adjustment mechanisms includes a ratchet assembly that selectively retains the base member in one of a plurality of adjustment positions.

In addition to one or more of the features described herein, the adjustment mechanism includes a gear track arranged on one of the plurality of walls.

In addition to one or more of the features described herein, the ratchet assembly includes an arm operatively to the base member, the arm supporting a ratchet wheel and a pawl.

In addition to one or more of the features described herein, further comprising a gear assembly connecting the ratchet wheel with the arm, the gear assembly including a gear portion that engages with the gear track.

In addition to one or more of the features described herein, the one of the plurality of walls includes a guide track arranged adjacent the gear track.

In addition to one or more of the features described herein, the guide track is continuous and includes a first section that extends along the gear track, a second section that is parallel to the first section, a third section connecting the first section and the second section at one end, and a fourth section connecting the first section and the second section at an opposing end.

In addition to one or more of the features described herein, the ratchet wheel includes a guide element that extends into and moves about the guide track.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
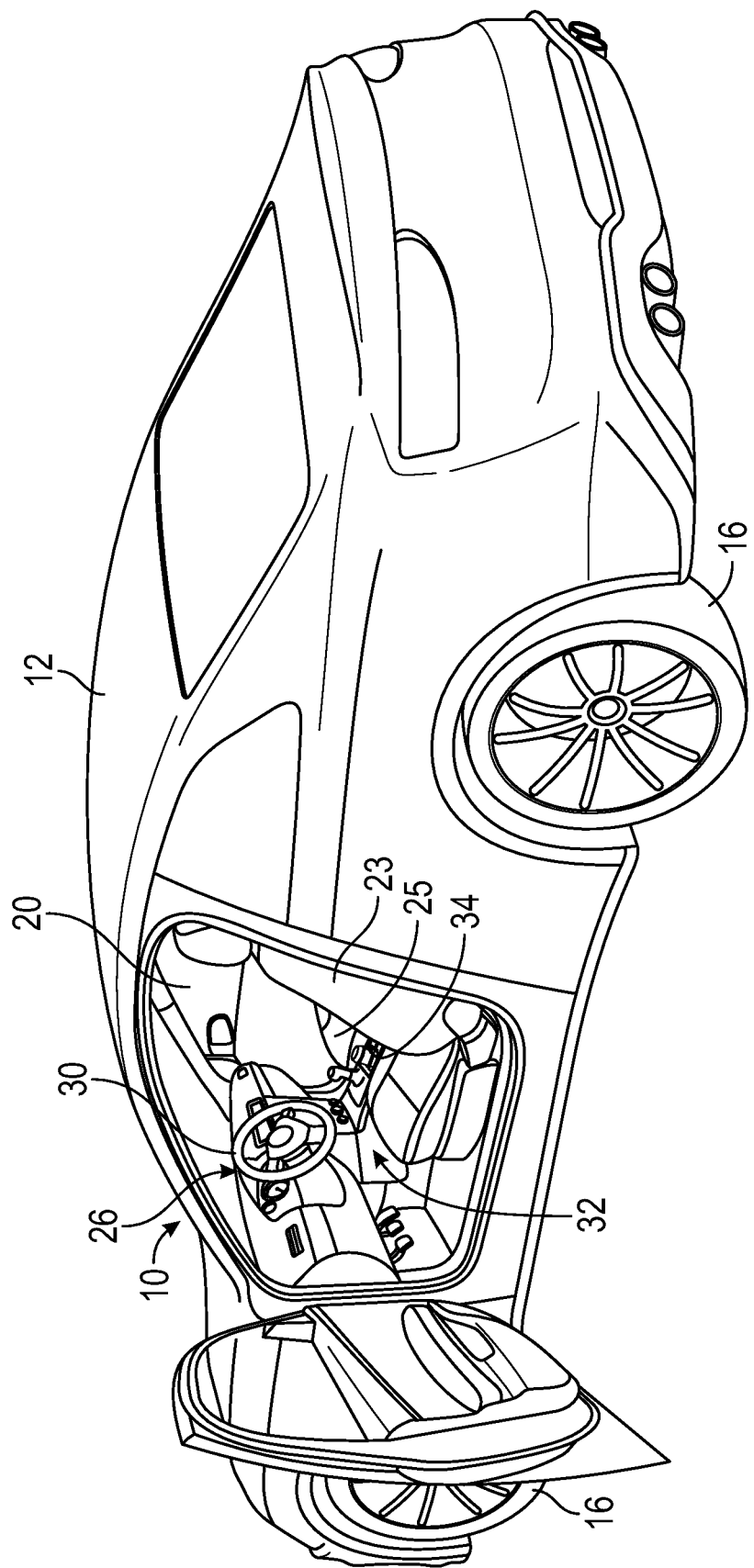
FIG. 1 is a left side perspective view of a vehicle including a storage bin having a floating base, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats, including a driver's seat 23 and a front passenger seat 25. Driver's seat 23 and front passenger seat 25 are positioned behind a dashboard 26. A steering control system 30 is arranged between driver's seat 23 and dashboard 26. In a non-limiting example, a center console 32 is arranged between driver's seat 23 and front passenger seat 25. Center console 32 supports a reconfigurable storage bin 34 as will be detailed herein.

Figure 2:
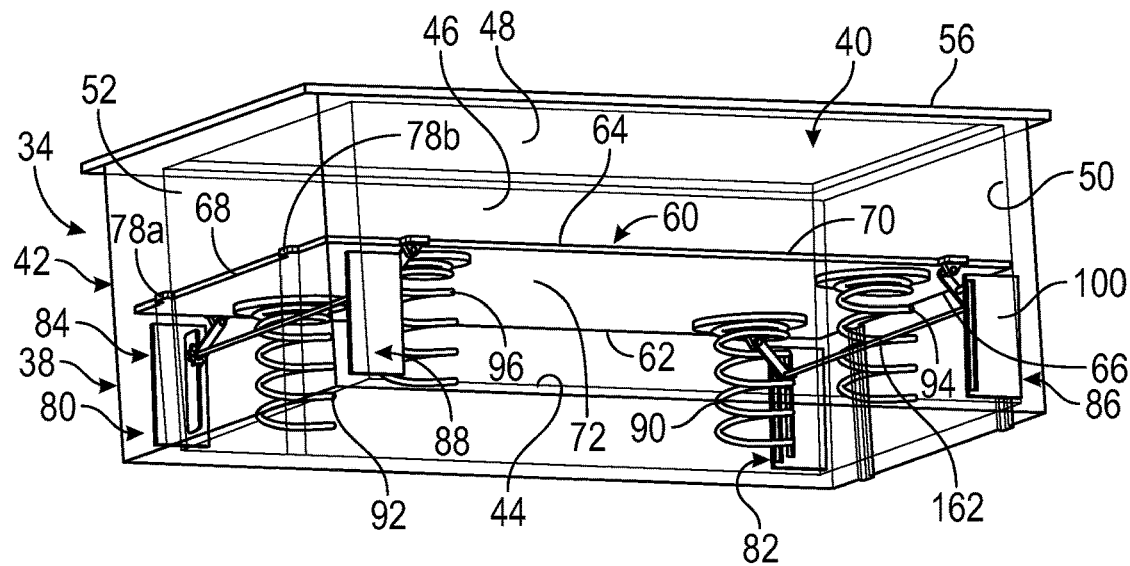
FIG. 2 is a glass view of the storage bin having the floating base including a plurality of adjustment mechanisms, in accordance with a non-limiting example.
Figure 3:
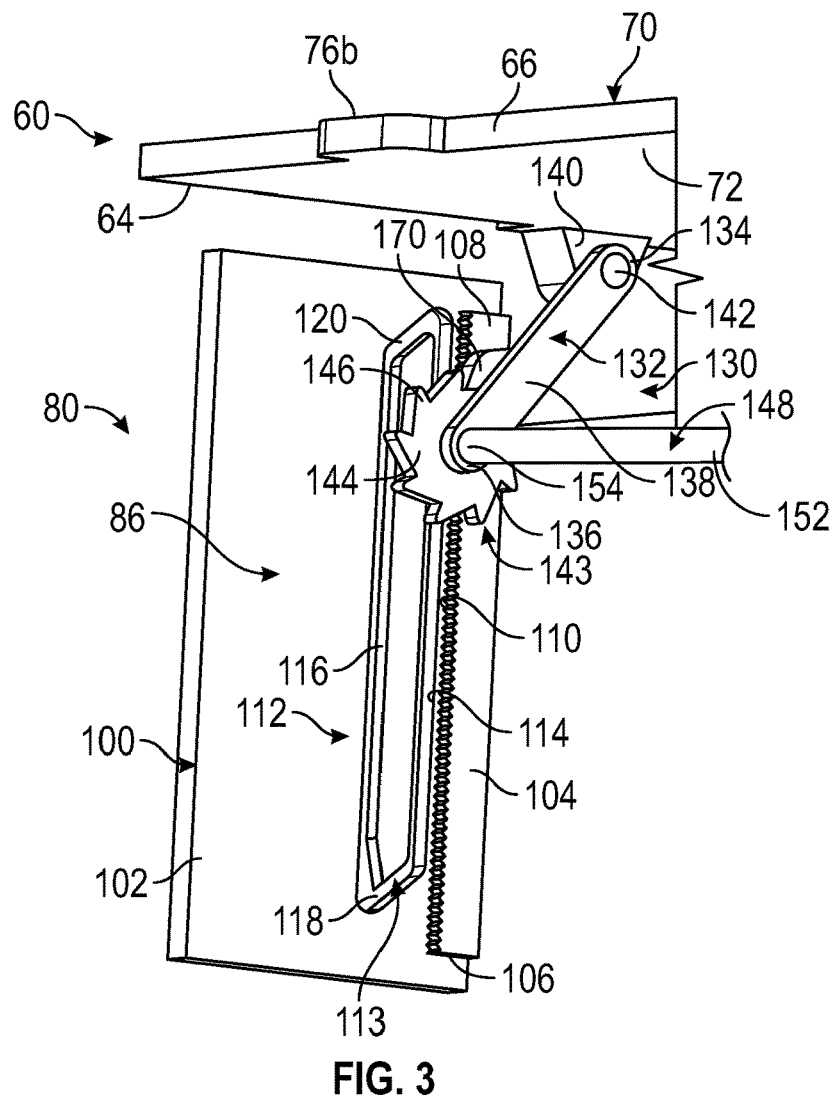
FIG. 3 is a view of one of the plurality of adjustment mechanisms, in accordance with a non-limiting example.
Figure 4:
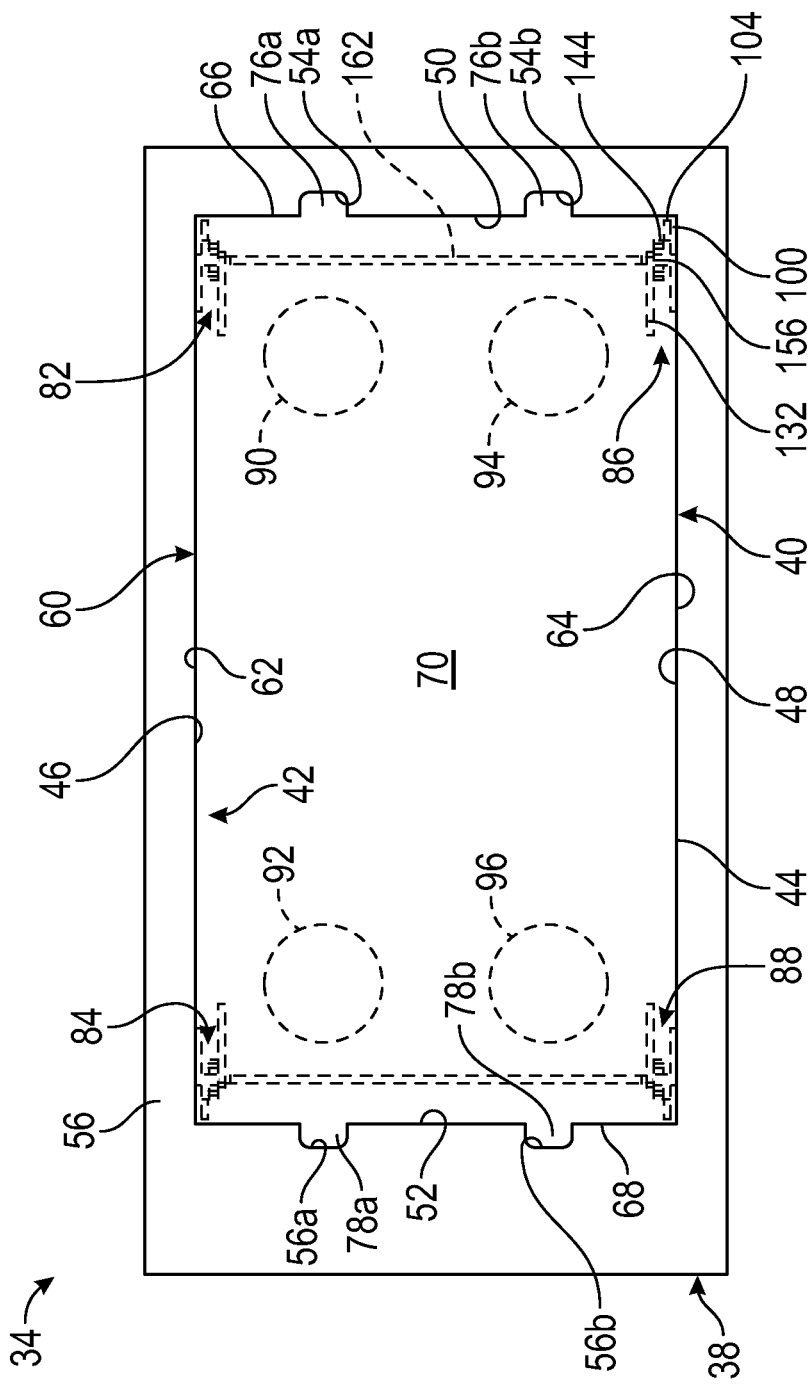
FIG. 4 is a top down view of the floating base in the storage bin, in accordance with a non-limiting example.

Reference will now follow to FIGS. 2 and 3 in describing reconfigurable storage bin 34 in accordance with a non-limiting example. Reconfigurable storage bin 34 includes a bin portion 38 having a storage volume 40. Bin portion 38 includes a plurality of walls 42 including a base wall 44, a first side wall 46, a second side wall 48, a first end wall 50, and a second end wall 52. As shown in FIG. 4, first end wall 50 includes a first recess 54a and a second recess 54b. Similarly, second end wall 52 includes a third recess 56a and a fourth recess 56b. Bin portion 38 includes an upper edge 56.

In a non-limiting example, reconfigurable storage bin 34 includes a base member 60 that may shift relative to base wall 44. That is, base member 60 is selectively height adjustable. More specifically, base member 60 may shift between base wall 44 and upper edge 56. In a non-limiting example, base member 60 includes a first side edge 62, a second side edge 64 that is opposite first side edge 62, a first end edge 66, and a second end edge 68 that is opposite to first end edge 66. Base member 60 is also shown to include an upper surface 70 and a lower surface 72.

In a non-limiting example shown in FIG. 4, a first projection 76a and a second projection 76b extend outwardly of first end edge 66. A third projection 78a and a fourth projection 78b extend outwardly of second end edge 68. As base member 60 shifts within storage volume 40, first and second projections 76a and 76b travel in first recess 54a and second recess 54b respectively and third projection 78a and fourth projection 78b travel in third recess 56a and fourth recess 56b respectively.

In a non-limiting example, a plurality of adjustment mechanisms 80 operatively connect base member 60 to select ones of the plurality of walls 42. A first adjustment mechanism 82 and a second adjustment mechanism 84 connect first side edge 62 of base member 60 with first side wall 46. A third adjustment mechanism 86 and a fourth adjustment mechanism 88 connect second side edge 64 with second side wall 48. In addition to adjustment mechanisms 80, a plurality of biasing members connect base member 60 with base wall 44. A first biasing member 90 is arranged adjacent to first adjustment mechanism 82, a second biasing member 92 is arranged adjacent to second adjustment mechanism 84, a third biasing member 94 is arranged adjacent to third adjustment mechanism 86, and a fourth biasing member 96 is arranged adjacent to fourth adjustment mechanism 88. The biasing members urge base member 60 toward upper edge 56.

Figure 5:
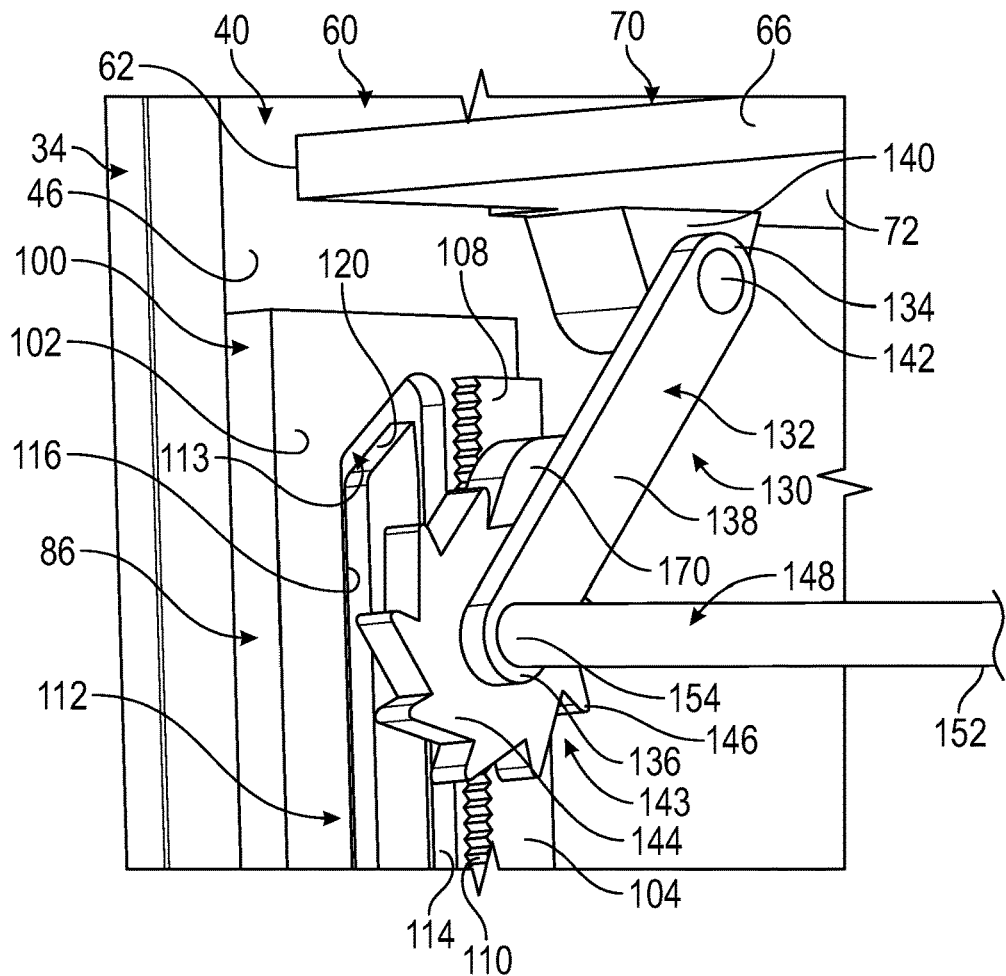
FIG. 5 is a detail view of the one of the plurality of adjustment mechanisms of FIG. 3, in accordance with a non-limiting example.
Figure 6:
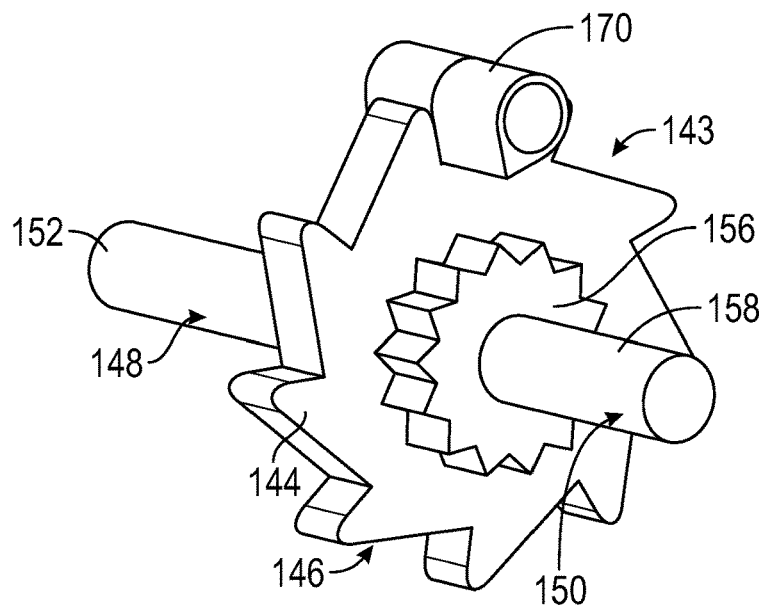
FIG. 6 is a perspective view of a gear assembly of the one of the plurality of adjustment mechanisms of FIG. 3, in accordance with a non-limiting example.

Reference will follow to FIGS. 3, 5 and 6 in describing third adjustment mechanism 86 with an understanding that first adjustment mechanism 82, second adjustment mechanism 84, and fourth adjustment mechanism 88 include similar structure. Third adjustment mechanism 86 includes a first portion 100 that is stationary. First portion 100 includes a member 102 supporting a gear track 104 including a first end 106 arranged above base wall 44 and a second end 108 spaced from upper edge 56. A plurality of teeth 110 extends between first end 106 and second end 108. The plurality of teeth 110 define a plurality of adjustment positions for base member 60. A guide track 112 is arranged adjacent to gear track 104. Guide track 112 is defined by a continuous recess 113 formed in member 102.

Guide track 110 includes a first section 114 that extends parallel to gear track 104, a second section 116 that is spaced from first section 114 and is parallel to gear track 104, a third section 118 that joins first section 114 and second section 11 near first end 106 of gear track 104 and a fourth section 120 that joins first section 114 and second section 11 near second end 108 of gear track 104. Third section 118 extends downwardly from first section 114 to second section 116 and fourth section 120 extends upwardly from second section 116 to first section 114.

In a non-limiting example, third adjustment mechanism 86 also includes a second portion 130 that is dynamic. Second portion 130 is mounted to base member 60. Second portion 130 as shown in FIGS. 3 and 5, includes an arm 132 having a first end portion 134, a second end portion 136, and an intermediate portion 138 that extends between first end portion 134 and second end portion 136. Base member 60 includes an arm support 140 mounted to lower surface 72. First end portion 134 of arm 132 is pivotally connected to arm support 140 by a hinge pin 142. A ratchet assembly 143 including a ratchet wheel 144 including a plurality of ratchet teeth 146 is rotatably mounted to second end portion 136 of arm 132.

As shown in FIG. 6, ratchet assembly 143 includes a support 148 having a first end section 150, a second end section 152, and an intermediate section 154 extending between first end section 150 and second end section 152. A gear portion 156 is mounted to intermediate section 154. Second end section 152 defines an axle (not separately labeled) that rotatably connects with second end portion 136 of arm 132. In a non-limiting example, first end section 150 forms a guide element 158 that travels in guide track 112 when base member 60 shifts between base wall 44 and upper edge 56 as will be detailed herein. Second end section 152 may be threaded and engage with a connector rod 162, FIG. 2, that extends between and connects first adjustment mechanism 82 and third adjustment mechanism 86. Ratchet assembly 143 further includes a pawl 170 that is pivotally mounted to intermediate portion 138 of arm 132.

Figure 7:
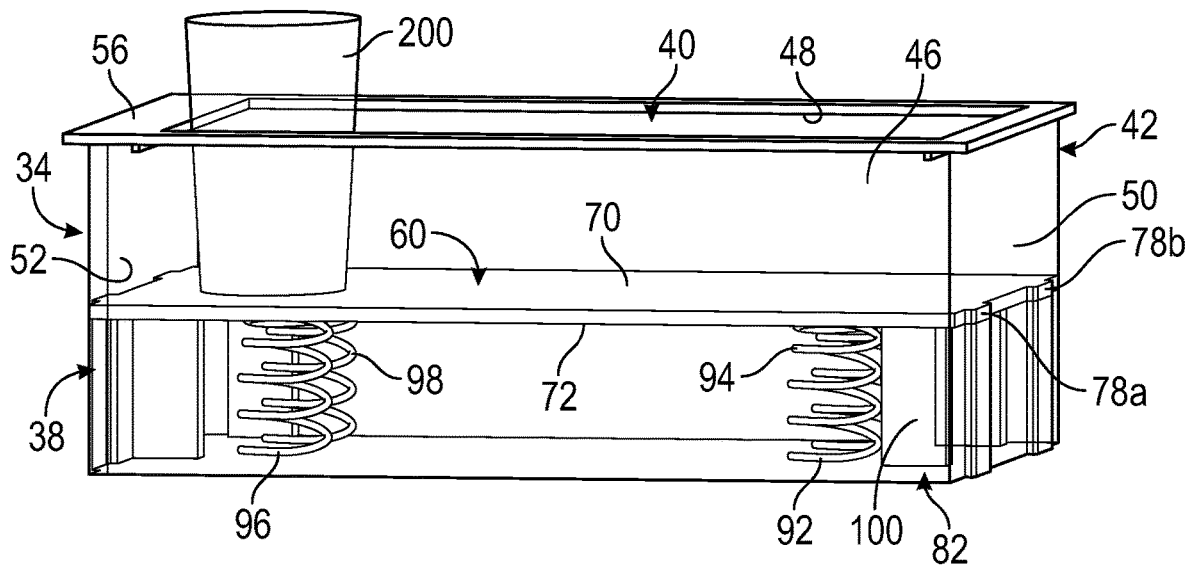
FIG. 7 is a glass view of the storage bin with the floating base in a first position; in accordance with a non-limiting example.
Figure 8:
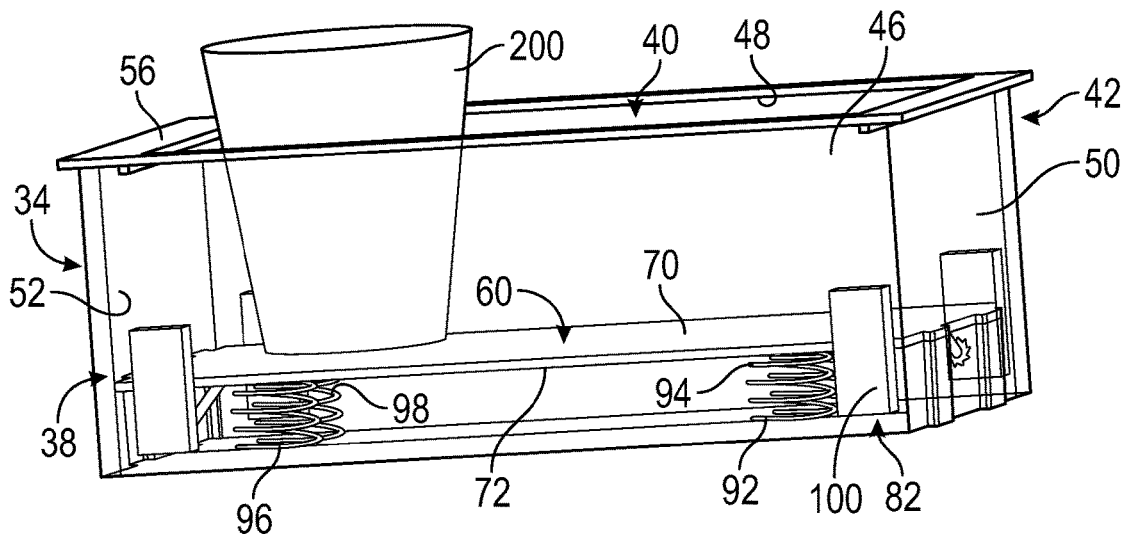
FIG. 8 is a glass view of the storage bin of FIG. 7, showing the floating base in a second position, in accordance with a non-limiting example.

In accordance with a non-limiting example, a user may adjust a depth of storage volume 40 by shifting base member 60 between base wall 44 and upper edge 56. For example, base member 60 may be spaced a first distance from upper edge 56 as shown in FIG. 7. If a taller object, such as cup 200 is placed in bin portion 38, pressure may be applied to base member 60. The pressure causes, for example, gear portion 156 to engage with plurality of teeth 110 on gear track 112 causing ratchet wheel 144 to rotate past pawl 170. When in a desired position such as shown in FIG. 8, ratchet teeth 146 engage with pawl 170 to prevent biasing members 90, 92, 94, and 96 from forcing base member 60 upwardly.

If upward movement is desired, base member 60 is pushed downwardly until guide element 158 passes from first section 114 into second section 116. At this point, arm 132 travels outwardly disengaging gear portion 156 from gear track 104. Continued downward movement of base member 60 causes guide element 158 to enter into third section 118 of guide track 112. At this point, biasing members 90, 92, 94, and 96 urge base member 60 upwardly until guide element 158 travels the length of fourth section 120 causing gear portion 156 to once again engage with gear track 104.

At this point, if further adjustment is desired, downward movement may be once again applied to base member 60. The downward movement continues until a desired position of base member 60 in storage volume 40 is achieved. Base member 60 may be released and the plurality of adjustment mechanisms 80 will maintain the desired position. Reconfigurable storage bin 34, in accordance with a non-limiting example, allows a user to adjust storage zone depth in order to accommodate a wide range of objects.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A storage bin for a vehicle comprising:
   a bin portion including storage volume defined by a plurality of walls including a base wall, a first side wall, a second side wall, a first end wall, and a second end wall;
   a base member arranged in the storage volume, the base member being selectively height adjustable relative to the base wall;
   a plurality of adjustment mechanisms operatively connected between the bin portion and the base member; and
   a plurality of biasing members disposed between the base wall and the base member.

2. The storage bin according to claim 1, wherein each of the plurality of adjustment mechanisms includes a ratchet assembly that selectively retains the base member in one of a plurality of adjustment positions.

3. The storage bin according to claim 2, wherein each of the plurality of adjustment mechanisms includes a gear track arranged on one of the plurality of walls.

4. The storage bin according to claim 3, wherein the ratchet assembly includes an arm operatively to the base member, the arm supporting a ratchet wheel and a pawl.

5. The storage bin according to claim 4, further comprising a gear assembly connecting the ratchet wheel with the arm, the gear assembly including a gear portion that engages with the gear track.

6. The storage bin according to claim 5, wherein the one of the plurality of walls includes a guide track arranged adjacent the gear track.

7. The storage bin according to claim 6, wherein the guide track is continuous and includes a first section that extends along the gear track, a second section that is parallel to the first section, a third section connecting the first section and the second section at one end, and a fourth section connecting the first section and the second section at an opposing end.

8. The storage bin according to claim 7, wherein the ratchet wheel includes a guide element that extends into and moves about the guide track.

9. The storage bin according to claim 1, wherein the biasing members extend between the base wall and the base member.

10. The storage bin according to claim 1, wherein the base member at an uppermost position thereof is within the storage volume.

11. A vehicle comprising:
    a body defining in part a passenger compartment; and
    a storage bin arranged in the passenger compartment, the storage bin comprising:
    a bin portion including storage volume defined by a plurality of walls including a base wall, a first side wall, a second side wall, a first end wall, and a second end wall;
    a base member arranged in the storage volume, the base member being selectively height adjustable relative to the base wall;
    a plurality of adjustment mechanisms operatively connected between the bin portion and the base member; and
    a plurality of biasing members disposed between the base wall and the base member.

12. The vehicle according to claim 11, wherein each of the plurality of adjustment mechanisms includes a ratchet assembly that selectively retains the base member in one of a plurality of adjustment positions.

13. The vehicle according to claim 12, wherein each of the plurality of adjustment mechanisms includes a gear track arranged on one of the plurality of walls.

14. The vehicle according to claim 13, wherein the ratchet assembly includes an arm operatively to the base member, the arm supporting a ratchet wheel and a pawl.

15. The vehicle according to claim 14, further comprising a gear assembly connecting the ratchet wheel with the arm, the gear assembly including a gear portion that engages with the gear track.

16. The vehicle according to claim 15, wherein the one of the plurality of walls includes a guide track arranged adjacent the gear track.

17. The vehicle according to claim 16, wherein the guide track is continuous and includes a first section that extends along the gear track, a second section that is parallel to the first section, a third section connecting the first section and the second section at one end, and a fourth section connecting the first section and the second section at an opposing end.

18. The vehicle according to claim 17, wherein the ratchet wheel includes a guide element that extends into and moves about the guide track.

19. The vehicle according to claim 11, wherein the biasing members extend between the base wall and the base member.

20. The vehicle according to claim 11, wherein the base member at an uppermost position thereof is within the storage volume.

* * * * *